Nov. 12, 1940.   C. J. DAVIES   2,221,182

SUN VISOR

Filed May 6, 1940

INVENTOR.
CLARENCE J. DAVIES
BY Whittemore, Hulbert
& Belknap  ATTORNEYS

Patented Nov. 12, 1940

2,221,182

UNITED STATES PATENT OFFICE 2,221,182

SUN VISOR

Clarence J. Davies, Detroit, Mich., assignor to National Automotive Fibres, Inc., Detroit, Mich., a corporation of Delaware Application May 6, 1940, Serial No. 333,652

9 Claims. (Cl. 296—97)

The present invention relates to a sun visor and more particularly to a sun visor which is mounted on a rod for longitudinal adjustment along said rod and for rotational adjustment about said rod.

At the present time sun visors for motor vehicles are normally mounted on the rod, which in turn is mounted to the vehicle for swinging adjustment so as to position the sun visor adjacent the windshield or adjacent a side window of the vehicle. The sun visor comprises a flat plate, which according to present practice is opaque but which, of course, may if desired be light diffusing, or formed of a polarizing medium. Normally the visor is retained in inoperative position against or adjacent the top of the vehicle. In this position the supporting rod extends transversely of the vehicle, and in order to retain the visor in inoperative position friction means are employed to prevent rotation of the visor about the rod due to vibration of the vehicle. Instead of friction means, suitable latch means may be provided.

An objection to present types of visors is that the frictional means which prevents rotation of the visor about the rod also renders difficult longitudinal adjustment of the visor along the rod.

According to the present invention the frictional means is mounted or carried by the visor for relative movement therewith along the rod and it is so arranged that very little friction is present opposing the adjustment of the visor along the rod. The friction means is however constructed and arranged so that it provides a predetermined friction to rotation of the visor about the rod, this friction being sufficient to prevent accidental movement of the visor from inoperative position about the axis of the rod.

It is accordingly an object of the present invention to provide in a visor construction of the type described, friction means substantially freely movable with the visor along the rod by providing uniform frictional resistance to turning of the visor about the rod from any position of axial or rotational adjustment thereon.

More specifically it is an object of the invention to provide friction means comprising a plurality of friction plates substantially freely movable along the axis of a supporting rod but arranged to provide a predetermined resistance to turning of the visor about the axis of the rod.

It is a further object of the present invention to provide a visor assembly comprising a supporting rod having a longitudinally extending groove therein, a visor having spaced cylindrical portions engaging the rod and supporting the visor for both longitudinal and rotational adjustment thereon, friction plates surrounding the rod and located intermediate said cylindrical portions, alternate plates of which are locked against rotation on the rods and alternate plates of which are locked for simultaneous rotation on the rod with the visor, and pressure means urging said friction plates into frictional contact.

It is a further object of the invention to provide a visor having frictional plates, as aforesaid, which are substantially freely slidable longitudinally on the rod.

Other objects of the invention will be apparent as the description proceeds, and when taken in conjunction with the accompanying drawing, wherein:

Figure 1 is a front elevation of my improved visor construction;

Figure 2 is a section on the line 2—2, Figure 1;

Figure 3 is a section on the line 3—3, Figure 1;

Figure 4 is a section on the line 4—4, Figure 1; and

Figure 5 is a section on the line 5—5, Figure 1.

According to the present construction a supporting bracket 10 is provided adapted to be secured to a portion of the vehicle by securing means indicated generally at 11. The bracket 10 has an apertured boss 12 which receives an angular portion 13 of a supporting rod 14. Preferably the rod 14 is supported for pivotal movement in the boss 12, suitable frictional means being provided for retaining the rod 14 in any position to which it is moved. The rod 14, as thus far described, and the supporting bracket is conventional structure and forms no part of the present invention.

According to the present invention the rod 14 is provided with a longitudinally extending groove 15 which extends substantially the full length of the rod 14 and is open at the end thereof. The rod 14 is provided also with a transverse slot 16 which intersects the longitudinally extending slot 15 for a purpose which will presently appear.

The visor indicated generally at 20 comprises a flat plate 21, which may be of fiberboard or the like, and which has secured thereto a supporting unit 22, which is herein shown as formed of sheet metal and stapled or otherwise secured to the plate 21 as indicated at 23. The supporting unit 22 has a cylindrically formed portion 24 which is adapted to surround and closely embrace the rod 14. Preferably the cylindrical portion 24 engages the rod snugly but is not sufficiently tight thereon to exert any substantial frictional resistance to turning. More specifically it may be stated that the cylindrical portion 24 is carefully formed so as to embrace the rod 14 closely enough so that the visor 20 will not rattle on the rod 14 due to vibration of the motor vehicle.

Referring now to Figure 1 I have indicated a cut-out portion 25 of the cylindrical portion 24 which provides spaced cylindrical ears 24a and 24b. Intermediate the ears 24a and 24b and surrounding the rod 14 I provide a plurality of friction plates 26, which are best seen in detail in Figures 3 and 4.

In Figure 3 I have indicated plates 26a which are provided with a circular opening 27 therein adapted to fit closely but without substantial frictional contact over the rod 14. The plates 26 have extensions 28 thereon which are slotted as indicated at 29, and received within the slots 29 is the upper edge 30 of the supporting unit 22. As will be evident, the engagement between the portion 30 and the slot 29 locks the friction plate 26a to the visor 20 for rotation therewith about the axis of the rod 14.

As best indicated in Figure 4, the other friction plates 26b are also provided with a central opening 31 of a size adapted to receive the rod 14 in guiding relation but without substantial frictional resistance to relative movement. The plates 26b are provided with keys 32 which are adapted to extend within the longitudinal groove 15 previously referred to. The keys 32 are of a size sufficient to be received within the groove 15 so as to lock the plates 26b against relative turning on the rod 14, but at the same time to not offer any substantial resistance to longitudinal sliding of the plates 26b on the rods.

The plates 26a and 26b are arranged alternately, and preferably I form one set of plates, either 26a or 26b, of metal and the other set of plates of frictional material, such for example as fiber.

Also surrounding the rod 14, intermediate the gears 24a and 24b, I provide a coil spring 33 which is adapted to abut at one end against the ear 24a and which abuts at the other end against the assembly of plates 26. Obviously the spring 33 provides a frictional pressure contact between the plates 26a and 26b. Due to the fact that alternate plates, as for example 26a, are locked to the visor 20 for rotation therewith about the axis of the rod 14, while the plates 26b are locked to the rod 14 against relative rotation, rotation of the visor 20 about the rod 14 results in frictional sliding between adjacent plates 26a and 26b. Depending upon the material from which these plates are made, the number of plates, the area of contact between the plates, and the pressure exerted by the spring 33, the frictional resistance to turning of the visor 20 on the rod 14 may be accurately predetermined. This frictional resistance to turning will be constant for any position of the visor 20 along the rod 14, and will also be constant for any position of adjustment of the visor 20 about the axis of the rod 14. Also, as above described, the frictional plates 26a and 26b are movable with the visor 20 along the rod 14 without substantial resistance, irrespective of the resistance which these plates offer to turning of the visor.

I provide a stop plate 40, best seen in Figure 5, in the transverse slot 16 previously referred to. As indicated in this figure, the stop plate 40 is adapted to provide an abutment closing the longitudinal groove 15, and at the same time its dimensions are such that it is freely movable within the cylindrical portion 24 of the supporting unit 22. As will be evident, the stop plate 40 is adapted to limit longitudinal movement of the visor 20 on the rod 14. Thus for example, when the visor 20 is moved to the left as seen in Figure 1, until the stop plate 40 engages the left-hand friction plate 26b, and more particularly the key 32 thereof, further movement of the visor 20 is limited.

In order to disassemble the parts the visor 20 may be moved to the left, as seen in Figure 1, a short distance after the stop plate 40 engages the key 32 of the left-hand friction plate 26b, thus compressing the spring 33 and moving the stop plate 40 into the cut-out portion 25 intermediate the ears 24a and 24b. The stop plate 40 may then be removed, after which the panel may be withdrawn completely from the rod 14. To assemble the structure the rod 14 is passed through the ear 24a, the spring 33, the assembly of friction plates 26, and the ear 24b until the transverse slot 16 is positioned in the cut-out portion 25. At this time the plates 26 may be manually moved to the right as seen in Figure 1, exposing the transverse slot 16. The stop plate 40 may then be dropped into the slot, after which the visor 20 may be moved to the right a sufficient distance to position the transverse slot 16 and the stop plate 40 within the cylindrical ear 24b. This of course retains the stop plate 40 in position, as will be readily apparent.

While I have illustrated and described in detail a single specific form of visor, it will be understood that the same has been done solely to enable those skilled in the art to practice the invention, the scope of which is indicated by the appended claims.

What I claim as my invention is:

1. A sun visor assembly comprising a supporting rod and a flat visor mounted thereon for swinging adjustment about the axis of said rod and for sliding adjustment along the axis of said rod, friction plates on said rod, some of said plates being locked against rotation on said rod, and other of said plates secured to said visor for swinging therewith, and resilient means for causing said plates to engage frictionally to offer resistance to swinging adjustment of said visor.

2. A sun visor assembly comprising a supporting rod and a flat visor mounted thereon for swinging adjustment about the axis of said rod and for sliding adjustment along the axis of said rod, friction plates on said rod, some of said plates being locked against rotation on said rod, and other of said plates secured to said visor for swinging therewith, and resilient means for causing said plates to engage frictionally to offer resistance to swinging adjustment of said visor, said plates being substantially freely adjustable along said rod.

3. A visor assembly comprising a supporting rod, a visor having a generally cylindrical portion slidable about the axis of said rod, a plurality of plates on said rod, means for retaining alternate plates against rotation on said rod, means for retaining the balance of said plates on said rod for rotation thereon with said visor, and spring means urging said plates into frictional engagement.

4. A visor assembly comprising a supporting rod, a visor having a generally cylindrical portion slidable along and about the axis of said rod, a plurality of plates on said rod mounted for substantially free adjustment along said rod, means for retaining alternate plates against rotation on said rod, means for retaining the balance of said plates on said rod for rotation thereon with said visor, and spring means urging said plates into frictional engagement.

5. A visor assembly comprising a rod having a longitudinal groove extending therealong, a visor having a pair of spaced cylindrical portions embracing said rod, a friction plate on said rod having a key extending into said groove to retain said plate against turning on said rod, a second friction plate having a portion engaging said visor to prevent relative turning between said second plate and said visor, and a coil spring intermediate said spaced cylindrical portions surrounding said rod urging said friction plates into pressure contact.

6. A visor assembly comprising a rod having a longitudinal groove extending therealong, a visor having a pair of spaced cylindrical portions embracing said rod, a friction plate on said rod having a key extending into said groove to retain said plate against turning on said rod, a second friction plate having a portion engaging said visor to prevent relative turning between said second plate and said visor, and a coil spring intermediate said spaced cylindrical portions surrounding said rod urging said friction plates into pressure contact, said visor, plates, and spring being substantially freely adjustable along said rod.

7. A visor assembly comprising a rod having a longitudinal groove extending therealong, a visor having a pair of spaced cylindrical portions embracing said rod, a friction plate on said rod having a key extending into said groove to retain said plate against turning on said rod, a second friction plate having a portion engaging said visor to prevent relative turning between said second plate and said visor, and a coil spring intermediate said spaced cylindrical portions surrounding said rod urging said friction plates into pressure contact, said visor, plates, and spring being substantially freely adjustable along said rod, and an abutment closing said groove and engageable with the key of said plate to limit sliding of said visor along said rod.

8. A visor assembly comprising a rod having a longitudinal groove extending therealong, a visor having a pair of spaced cylindrical portions embracing said rod, a friction plate on said rod having a key extending into said groove to retain said plate against turning on said rod, a second friction plate having a portion engaging said visor to prevent relative turning between said second plate and said visor, and a coil spring intermediate said spaced cylindrical portions surrounding said rod urging said friction plates into pressure contact, said visor, plates, and spring being substantially freely adjustable along said rod, said rod having a transverse slot intersecting said longitudinal groove, a stop plate receivable in said transverse slot conforming substantially to the outline of said rod and adapted to close said longitudinal groove, whereby said stop plate may be received within one of said cylindrical portions and retained thereby in said transverse slot.

9. A visor assembly comprising a rod having a longitudinal groove extending therealong, a visor having a pair of cylindrical portions embracing said rod, a plurality of friction plates on said rod intermediate said cylindrical portions, said plates being substantially freely slidable along said rod, keys on alternate plates engaging said groove and retaining said alternate plates against rotation on said rod, and means for securing the balance of said plates to said visor for rotation therewith on said rod, adjacent plates being respectively formed of metal and fibrous material.

CLARENCE J. DAVIES.